United States Patent
Shin et al.

(10) Patent No.: US 12,436,387 B2
(45) Date of Patent: Oct. 7, 2025

(54) HEAD-UP DISPLAY APPARATUS

(71) Applicants: HYUNDAI MOTOR COMPANY, Seoul (KR); Kia Corporation, Seoul (KR)

(72) Inventors: Hui Won Shin, Hwaseong-si (KR); Dong Woo Kim, Seongnam-si (KR); Ju Hyuk Kim, Suwon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 533 days.

(21) Appl. No.: 17/890,622

(22) Filed: Aug. 18, 2022

(65) Prior Publication Data

US 2023/0185087 A1    Jun. 15, 2023

(30) Foreign Application Priority Data

Dec. 13, 2021    (KR) .................. 10-2021-0178096

(51) Int. Cl.
  *G02B 27/01*    (2006.01)
  *B60K 35/00*    (2024.01)
  *B60K 35/23*    (2024.01)

(52) U.S. Cl.
  CPC ......... *G02B 27/0101* (2013.01); *B60K 35/00* (2013.01); *G02B 27/0149* (2013.01); *G02B 27/0179* (2013.01); *B60K 35/23* (2024.01); *B60K 2360/334* (2024.01); *G02B 2027/0118* (2013.01)

(58) Field of Classification Search
  CPC ... G02B 27/01–0189; G02B 2027/0105–0198; B60K 35/00–90; B60K 2360/00–96
  See application file for complete search history.

(56) References Cited

U.S. PATENT DOCUMENTS

| | | | |
|---|---|---|---|
| 7,690,799 B2 | 4/2010 | Nestorovic et al. | |
| 2013/0194674 A1* | 8/2013 | Horiuchi | G02B 5/10 |
| | | | 359/633 |
| 2016/0025973 A1 | 1/2016 | Guttag et al. | |
| 2018/0354366 A1* | 12/2018 | Yoshimura | B60R 11/00 |

(Continued)

FOREIGN PATENT DOCUMENTS

| | | |
|---|---|---|
| JP | S61-238015 A | 10/1986 |
| JP | 2001-97073 A | 4/2001 |
| KR | 10-2010-0033770 A | 3/2010 |

*Primary Examiner* — Christopher A Lamb, II
(74) *Attorney, Agent, or Firm* — MORGAN, LEWIS & BOCKIUS LLP (57) ABSTRACT

A head-up display apparatus includes an image source including a display; a first mirror located above the image source, and having a predetermined transmittance; a second mirror facing the first mirror, and selectively moving, by a driving unit, between an operating position and a protection position; a light sensor located behind the first mirror, and configured for detecting sunlight; and a controller electrically connected to the driving unit and configured for controlling the driving unit based on the sunlight detected by the light sensor, wherein the operating position is a position in which light transmission is allowed between the image source and a windshield, and the protection position is a position in which light transmission is blocked between the image source and the windshield.

16 Claims, 11 Drawing Sheets

(56) References Cited

U.S. PATENT DOCUMENTS

| | | | |
|---|---|---|---|
| 2019/0049729 A1* | 2/2019 | Honma | G02B 27/0149 |
| 2019/0146218 A1* | 5/2019 | Yamazoe | G02B 27/01 |
| | | | 359/631 |
| 2019/0346674 A1* | 11/2019 | Miyake | G02B 27/0101 |

* cited by examiner

HEAD-UP DISPLAY APPARATUS

CROSS-REFERENCE TO RELATED APPLICATION

The present application claims priority to Korean Patent Application No. 10-2021-0178096, filed on Dec. 13, 2021, the entire contents of which is incorporated herein for all purposes by this reference.

BACKGROUND OF THE PRESENT DISCLOSURE

Field of the Present Disclosure

The present disclosure relates to a head-up display apparatus, and more particularly, to a head-up display apparatus safely protecting an image source by blocking sunlight from entering a light engine.

Description of Related Art

A head-up display apparatus is configured to project virtual images including various vehicle information (vehicle speed, navigation information, the amount of fuel remaining, warnings, etc.) into the driver's field of view. The head-up display apparatus includes a combiner head-up display apparatus reflecting the images onto a screen, and a windshield head-up display apparatus directly projecting the images onto a windshield.

The windshield head-up display apparatus may project the virtual images onto the windshield so that the driver may keep driving safely without taking his or her eyes off from the driver's field of view or the road. The windshield head-up display apparatus may include an image source generating an image, and an optical system transmitting the image from the image source to the windshield.

In recent years, an augmented reality head-up display apparatus has been applied. The augmented reality head-up display apparatus may be configured to display virtual images overlaid on the road/objects which the driver can see through the windshield. As the screen size of the augmented reality head-up display apparatus increases and the display distance thereof increases, the size of an opening of a vehicle dashboard may increase, and accordingly the amount of sunlight into the augmented reality head-up display apparatus may relatively increase. Thus, the sunlight may be focused on an image source of the augmented reality head-up display apparatus, resulting in a high risk of damage by fire to a display of the image source.

The information included in this Background of the present disclosure is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing a head-up display apparatus improving durability of an image source by blocking sunlight from entering the image source.

According to an aspect of the present disclosure, a head-up display apparatus may include: an image source including a display; a first mirror located above the image source, and having a predetermined transmittance; a second mirror facing the first mirror, and selectively moving, by a driving unit, between an operating position and a protection position; a light sensor located behind the first mirror, and configured for detecting sunlight; a controller electrically connected to the driving unit and configured for controlling the driving unit based on the sunlight detected by the light sensor; and a housing including the first mirror, the second mirror, the light sensor, and the controller received in the housing. The operating position may be a position in which light transmission is allowed between the image source and a windshield, and the protection position may be a position in which light transmission is blocked between the image source and the windshield.

The controller may be configured to determine a surface temperature of the display of the image source based on the sunlight detected by the light sensor.

The housing may include a main printed circuit board (PCB) received in the housing, and the controller may be electrically connected to the main PCB.

The head-up display apparatus may further include a light shield blocking light from being reflected to the outside of the housing, and the light shield may have a low-reflection plating layer coated on a surface thereof.

The light shield may include a first shield portion provided between the first mirror and the second mirror, and a second shield portion provided between the first mirror and the image source.

The first shield portion may include a bottom wall extending obliquely from a bottom end portion of the first mirror to a bottom end portion of the second mirror, a pair of side walls provided on first and second sides of the bottom wall, and a rear wall provided on a rear end portion of the bottom wall.

The bottom end portion of the first mirror may be located higher than the bottom end portion of the second mirror, and the bottom wall may be inclined by a height difference between the bottom end portion of the first mirror and the bottom end portion of the second mirror.

The second shield portion may be a duct extending from the first shield portion toward the image source.

The first shield portion may have an upper opening which is opened toward the image source, and the second shield portion may have a lower opening which is opened toward the image source.

The first shield portion may further include an extension wall extending from a front edge portion of the bottom wall toward the housing, and the extension wall may be inclined at a predetermined angle corresponding to a movement trajectory of the bottom end portion of the second mirror.

The first shield portion may have a mounting portion protruding rearward from the rear wall, and the light sensor may be mounted on the mounting portion through a mounting bracket.

The light sensor may be mounted on a sensor PCB, and the sensor PCB may be electrically connected to the main PCB.

The sensor PCB may be mounted on the mounting bracket. The mounting bracket may have a hole opened toward the first mirror, and the light sensor may be inserted into the hole.

The mounting bracket may have a plurality of reflective surfaces provided around the hole, and the plurality of reflective surfaces may be inclined toward the hole.

The head-up display apparatus may further include a cover detachably joined to a top portion of the housing, the cover may have a transparent window, and the transparent window of the cover may be aligned with an opening of a dashboard.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
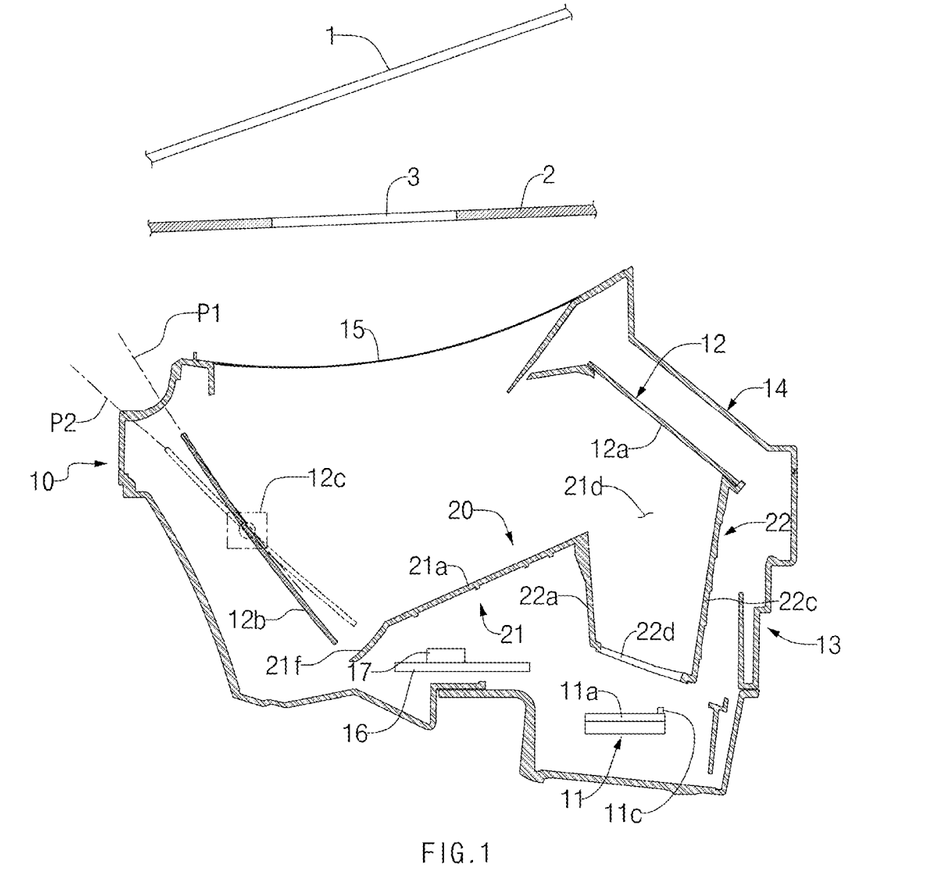
FIG. 1 illustrates a head-up display apparatus according to an exemplary embodiment of the present disclosure, which is provided below the windshield.
Figure 2:
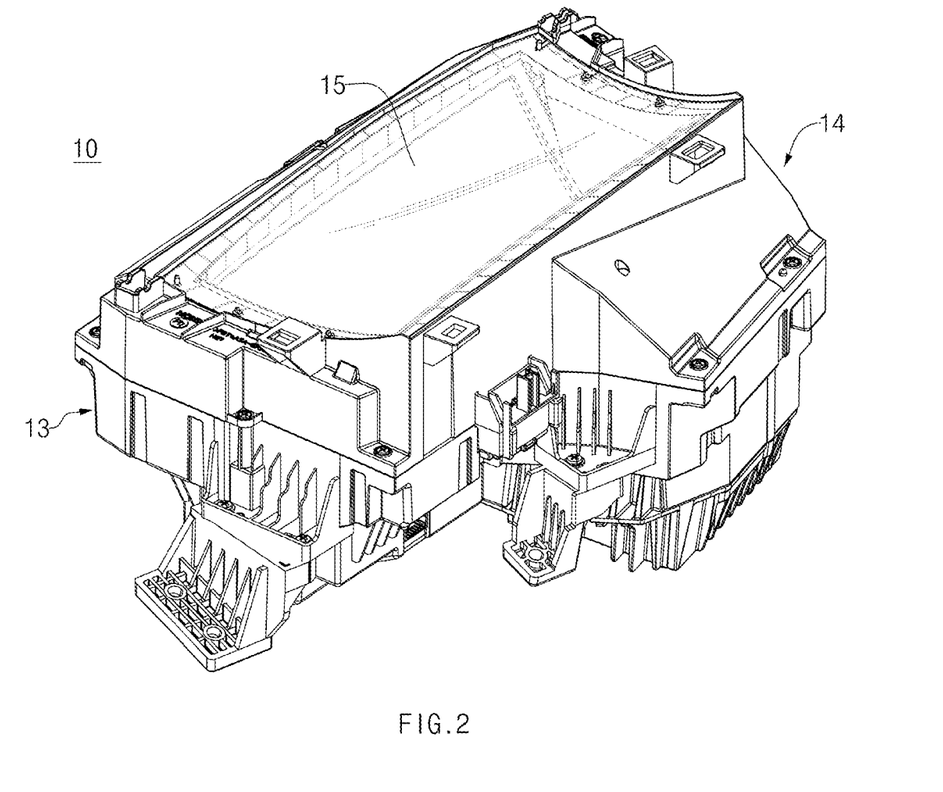
FIG. 2 illustrates a perspective view of a head-up display apparatus according to an exemplary embodiment of the present disclosure.
Figure 3:
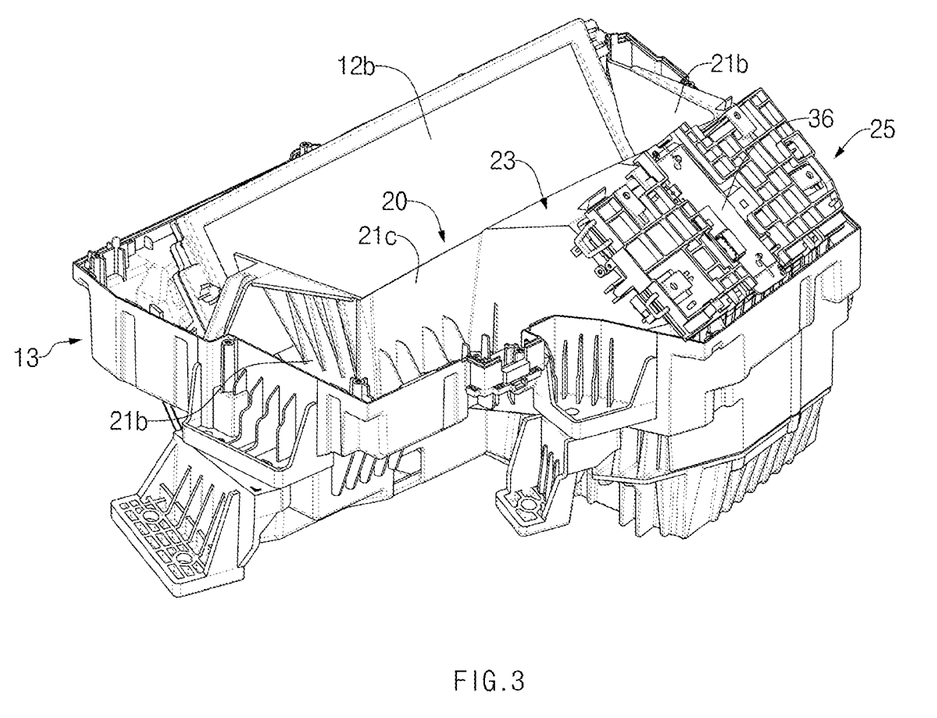
FIG. 3 illustrates a perspective view of the head-up display apparatus illustrated in FIG. 2, from which a cover is removed.

Referring to FIG. 1, a head-up display apparatus 10 according to an exemplary embodiment of the present disclosure may be provided below a windshield 1 of a vehicle.

The head-up display apparatus 10 may include an image source 11, an optical system 12 transmitting image light generated by the image source 11 to the windshield 1, and a housing 13 in which the image source 11 and the optical system 12 are received.

The image source 11 may be configured to generate the image light related to various vehicle information (vehicle speed, navigation information, the amount of fuel remaining, warnings, etc.). The image source 11 may include a display 11a such as liquid crystal display (LCD), light emitting diode display (LED), and vacuum fluorescent display (VFD).

Figure 4:
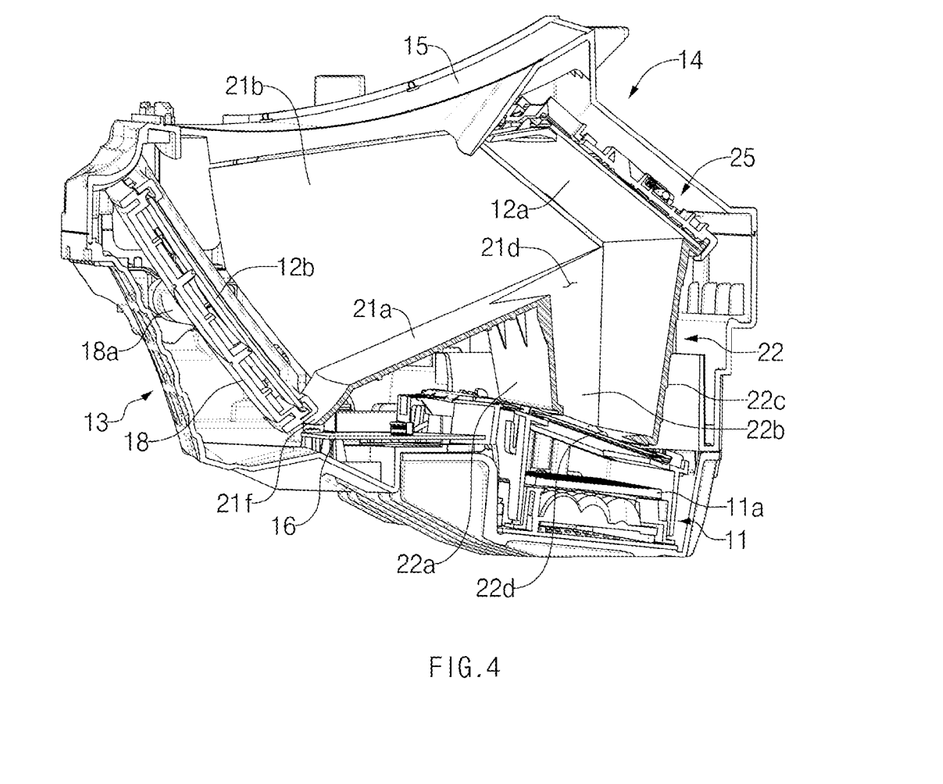
FIG. 4 illustrates a cut-away perspective view of the head-up display apparatus illustrated in FIG. 2.

The optical system 12 may include a first mirror 12a located above the image source 11, and a second mirror 12b facing the first mirror 12a. The first mirror 12a may be a fold mirror which is provided to be inclined with respect to the image source 11, and the first mirror 12a may be a plane mirror or aspherical mirror. The second mirror 12b may be rotatably mounted on the opposite of the first mirror 12a by a driving unit 12c, and the second mirror 12b may be an aspherical mirror. The driving unit 12c may have a driving motor, an electric belt, and the like, and the second mirror 12b may be rotatable by the driving unit 12c. Referring to FIG. 4, the second mirror 12b may be supported by a support bracket 18, and the support bracket 18 may have a shaft 18a extending from one edge portion thereof. The shaft 18a of the support bracket 18 may be rotated by the driving unit 12c, and accordingly the support bracket 18 and the second mirror 12b may rotate together.

Referring to FIG. 1, the second mirror 12b may move between an operating position P1 and a protection position P2.

The operating position P1 may be a position in which light transmission is allowed between the display 11a of the image source 11 and the windshield 1. When the second mirror 12b is in the operating position P1, the image light may be normally transmitted from the display 11a of the image source 11 to the windshield 1 through the first mirror 12a and the second mirror 12b so that the image light of the display 11a may be normally displayed on the windshield 1, and sunlight may be transmitted to the display 11a of the image source 11 through the second mirror 12b and the first mirror 12a. When the sunlight of a threshold or higher is transmitted to the display 11a of the image source 11, the display 11a of the image source 11 may be damaged by high temperature or high heat.

The protection position P2 may be a position in which the sunlight is prevented from being transmitted to the display 11a of the image source 11. That is, the protection position P2 may be a position in which light transmission is blocked between the display 11a of the image source 11 and the windshield 1. When the second mirror 12b is in the protection position P2, the sunlight may be blocked from being transmitted to the display 11a of the image source 11 through the second mirror 12b and the first mirror 12a, and the image light may be blocked from being transmitted from the display 11a of the image source 11 to the windshield 1 through the first mirror 12a and the second mirror 12b so that the image light of the display 11a may not be displayed on the windshield 1. When the second mirror 12b is in the protection position P2, the display 11a of the image source 11 may be prevented from being damaged by high temperature or high heat, and thus durability of the image source may be significantly improved.

Referring to FIG. 1, the housing 13 may be mounted in a dashboard 2 below the windshield 1, and the housing 13 may be provided below an opening 3 of the dashboard 2.

The housing 13 may have an internal space to receive the image source 11 and the optical system 12. The image source 11 may be located in a lower portion of the housing 13, and the optical system 12 may be located in an upper portion of the housing 13. A main printed circuit board (PCB) 16 may be provided on the bottom portion of the housing 13, and a controller 17 may be electrically connected to the main PCB 16. The controller 17 may be configured to control the image source 11 and the driving unit 12c of the second mirror 12b.

A cover 14 may be detachably joined to the top portion of the housing 13, and the cover 14 may have a transparent window 15 through which light transmits. The transparent window 15 may be aligned with the opening 3 of the dashboard 2.

The head-up display apparatus 10 according to an exemplary embodiment of the present disclosure may further include a light shield 20 blocking light from being reflected to the outside of the housing 13. The light shield 20 may have a low-reflection plating layer coated on its surface. Accordingly, the light shield 20 may block the light from being reflected to the outside so that the light shield 20 may stably guide the transmission of light between the optical system 12 and the image source 11.

Referring to FIGS. 1 and 4, the light shield 20 may include a first shield portion 21 provided between the first mirror 12a and the second mirror 12b, and a second shield portion 22 provided between the first mirror 12a and the image source 11.

The first shield portion 21 may include a bottom wall 21a extending obliquely from a bottom end portion of the first mirror 12a to a bottom end portion of the second mirror 12b, a pair of side walls 21b provided on both sides of the bottom wall 21a, and a rear wall 21c provided on a rear end portion of the bottom wall 21a. The bottom wall 21a, the pair of side walls 21b, and the rear wall 21c may define a light-transmitting guide cavity between the first mirror 12a and the second mirror 12b. the bottom end portion of the first mirror 12a may be located higher than the bottom end portion of the second mirror 12b, and accordingly the bottom wall 21a may be inclined by a height difference between the bottom end portion of the first mirror 12a and the bottom end portion of the second mirror 12b. The bottom wall 21a may have a first opening (upper opening) 21d which is opened toward the image source 11. The pair of side walls 21b may extend perpendicularly from both sides edge portions of the first mirror 12a. The rear wall 21c may extend perpendicularly from a rear edge portion of the bottom wall 21a. When the light is reflected between the first mirror 12a and the second mirror 12b, the first shield portion 21 may block the light from being reflected to the outside, and accordingly the first shield portion 21 may stably guide the transmission of light between the first mirror 12a and the second mirror 12b.

Referring to FIG. 1, the first shield portion 21 may further include an extension wall 21f extending from a front edge portion of the bottom wall 21a, and the extension wall 21f may be bent at a predetermined angle with respect to the bottom wall 21a. The extension wall 21f may contact or be slightly spaced from the bottom end portion of the second mirror 12b. When the second mirror 12b rotates, the bottom end portion of the second mirror 12b may contact or be slightly spaced from the extension wall 21f. The extension wall 21f may be inclined at a predetermined angle corresponding to a movement trajectory of the bottom end portion of the second mirror 12b, and accordingly the rotation of the second mirror 12b may be stably guided by the extension wall 21f. Referring to FIG. 4, a bottom end portion of the support bracket 18 may be guided along the extension wall 21f.

In an exemplary embodiment of the present invention, the extension wall 21f is curved corresponding to a movement trajectory of the bottom end portion of the second mirror 12b.

Figure 5:
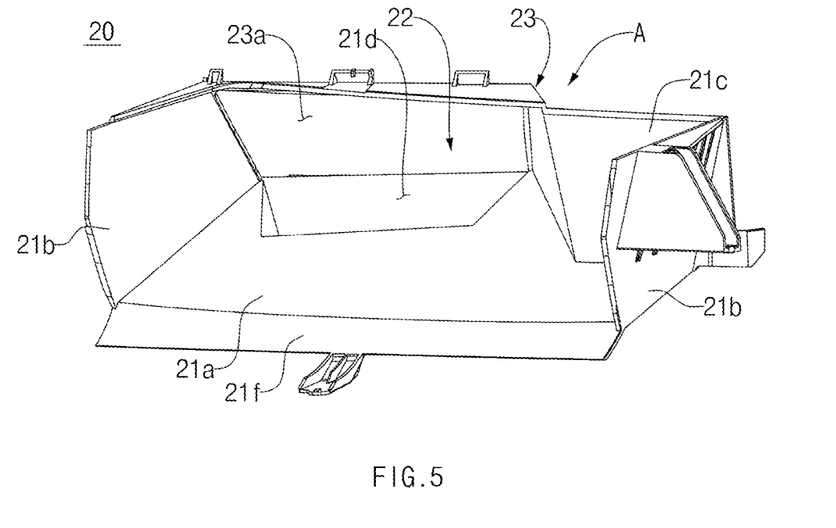
FIG. 5 illustrates a perspective view of a light shield of a head-up display apparatus according to an exemplary embodiment of the present disclosure.
Figure 6:
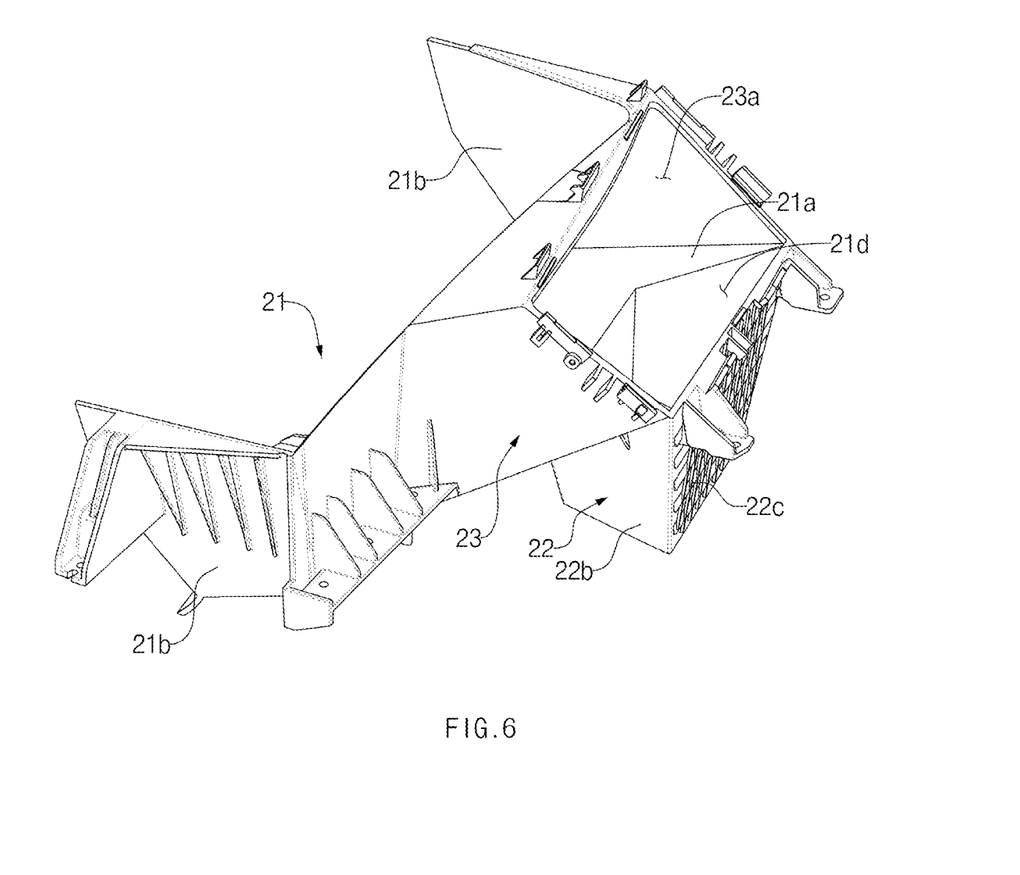
FIG. 6 illustrates a view, which is viewed in a direction indicated by arrow A of FIG. 5.

Referring to FIG. 5 and FIG. 6, the first shield portion 21 may have a mounting portion 23 protruding rearward from the rear wall 21c. The mounting portion 23 may have an opening 23a into which the first mirror 12a is fitted, and the first mirror 12a and a mounting bracket 25 may be mounted to the mounting portion 23. The mounting bracket 25 may be mounted to cover the opening 23a of the mounting portion 23. The mounting bracket 25 may have a plurality of hooks, and the plurality of hooks may be detachably snap-fitted to edge portions of the mounting portion 23 so that the mounting bracket 25 may be mounted on the mounting portion 23.

Referring to FIGS. 1 and 4, the second shield portion 22 may extend from the first opening 21d of the bottom wall 21a of the first shield portion 21 toward the image source 11, and the second shield portion 22 may be a duct including a front wall 22a, a pair of side walls 22b, and a rear wall 22c. The front wall 22a, the pair of side walls 22b, and the rear wall 22c may define a light-transmitting guide cavity between the first mirror 12a and the image source 11. The second shield portion 22 may have a second opening (lower opening) 22d provided in a bottom end portion thereof, and the second opening 22d may face the image source 11. When the light is transmitted between the first mirror 12a and the image source 11, the second shield portion 22 may block the light from being reflected to the outside, and accordingly the second shield portion 22 may stably guide the transmission of light between the first mirror 12a and the image source 11.

Figure 7:
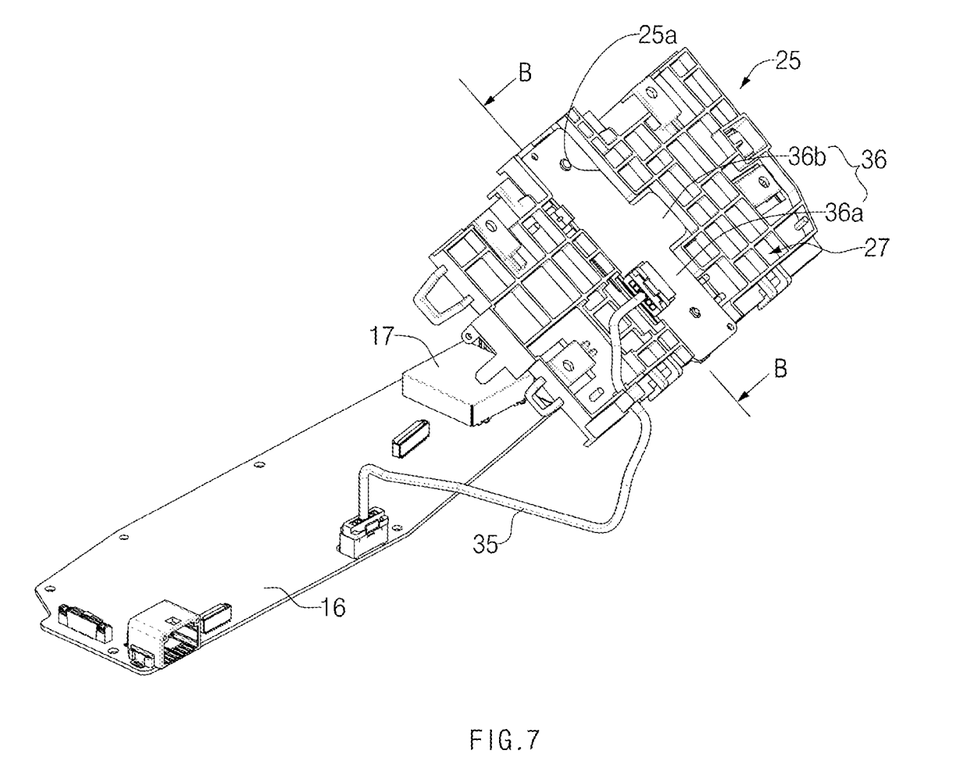
FIG. 7 illustrates the electrical connection of a sensor printed circuit board (PCB) mounted on a mounting bracket to a main PCB in a head-up display apparatus according to an exemplary embodiment of the present disclosure.
Figure 8:
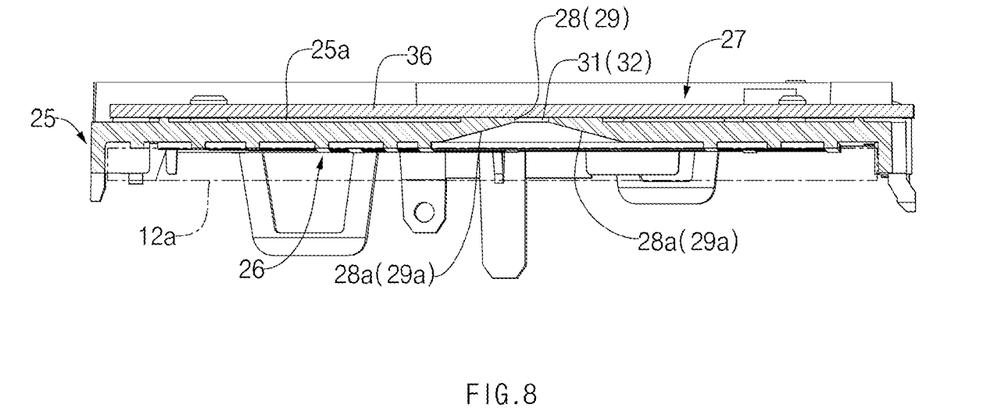
FIG. 8 illustrates a cross-sectional view, taken along line B-B of FIG. 7.
Figure 9:
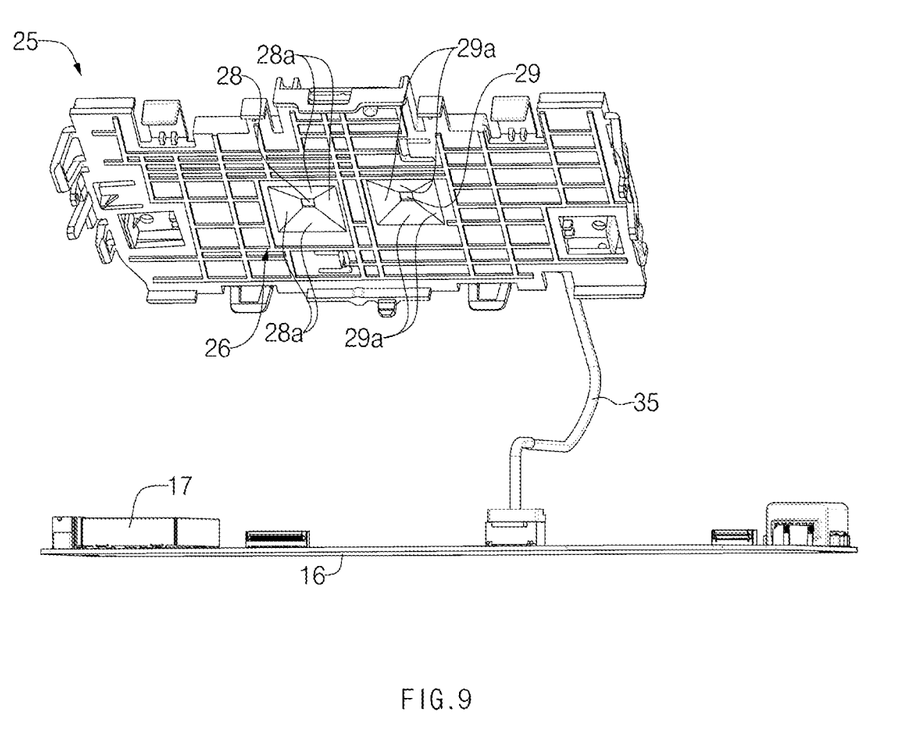
FIG. 9 illustrates a bottom view of a mounting bracket of a head-up display apparatus according to an exemplary embodiment of the present disclosure.
Figure 10:
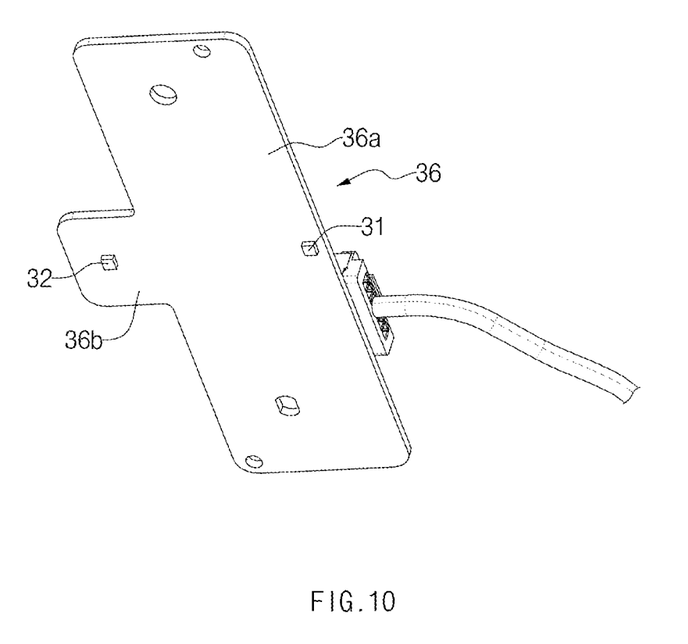
FIG. 10 illustrates a sensor PCB of a head-up display apparatus according to an exemplary embodiment of the present disclosure.

Referring to FIG. 8, one or more light sensors 31 and 32 may be provided behind the first mirror 12a. Referring to FIG. 10, one or more light sensors 31 and 32 may be mounted on a sensor PCB 36. Referring to FIGS. 7 and 9, the sensor PCB 36 may be electrically connected to the main PCB 16 through an electric wire 35. Referring to FIG. 7, the sensor PCB 36 may be mounted on the mounting bracket 25 through a fastener. Therefore, the one or more light sensors 31 and 32 may be mounted on the mounting portion through a mounting bracket. Referring to FIGS. 7 and 10, the sensor PCB 36 may have a T-like shape including a first portion 36a and a second portion 36b extending perpendicularly from the center portion of the first portion 36a. The first portion 36a may be longer than the second portion 36b.

Referring to FIG. 8, the mounting bracket 25 may have one or more holes 28 and 29 opened toward the first mirror 12a. The light sensors 31 and 32 may be inserted into the corresponding holes 28 and 29, respectively. Thus, the light sensors 31 and 32 may directly face the first mirror 12a through the corresponding holes 28 and 29. The first mirror 12a may have a predetermined transmittance allowing the sunlight to transmit, and accordingly the light sensors 31 and 32 may detect the illuminance (intensity) or amount of sunlight reflected to the first mirror 12a through the second mirror 12b. The controller 17 may determine a surface temperature of the display 11a of the image source 11 based on the illuminance or amount of sunlight detected by the light sensors 31 and 32. When the surface temperature of the display 11a exceeds a quality assurance temperature, the controller 17 may control the driving unit 12c to move the second mirror 12b to the protection position P2. When the surface temperature of the display 11a is equal to or less than the quality assurance temperature, the controller 17 may control the driving unit 12c to move the second mirror 12b to the operating position P1. Here, the quality assurance temperature may be a surface temperature of the display 11a at which the quality of the display 11a is ensured to operate normally.

As described above, the first mirror 12a may have a predetermined transmittance to allow the sunlight to transmit so that the light sensors 31 and 32 may detect the sunlight. For example, a first mirror according to the related art has a transmittance of 3% or less and a reflectance of 97% so that it may reflect image light received from a display of an image source toward a second mirror. According to an exemplary embodiment of the present disclosure, the first mirror 12a may have a predetermined transmittance to allow the sunlight to transmit. For example, when the transmittance of the first mirror 12a is 10%, the reflectance of the first mirror 12a may be 90%. Accordingly, the sunlight may be transmitted to the light sensors 31 and 32 through the first mirror 12a, and thus the light sensors 31 and 32 may accurately detect the illuminance or amount of sunlight entering the housing 13 of the head-up display apparatus 10. However, the transmittance and reflectance of the first mirror 12a may be inversely proportional to each other. When the transmittance of the first mirror 12a increases, the reflectance of the first mirror 12a may decrease, and thus brightness of the image light transmitted from the display 11a of the image source 11 to the windshield 1 may be relatively lowered. To deal with this, the controller 17 may compensate for the lowered reflectance by relatively increasing the brightness of the image light of the display 11a of the image source 11.

According to an alternative exemplary embodiment of the present disclosure, as illustrated in FIG. 1, the image source 11 may further include a temperature sensor or a light sensor 11c mounted on the display 11a, directly measuring the surface temperature of the display 11a or the illuminance or amount of sunlight transmitted to the display 11a.

Referring to FIG. 8, the mounting bracket 25 may have a first surface 26 facing the first mirror 12a, and a second surface 27 opposite to the first surface 26. The mounting bracket 25 may have a plurality of reflective surfaces 28a and 29a provided on the first surface 26, and the mounting bracket 25 may have a space recessed from the first surface 26 by the plurality of reflective surfaces 28a and 29a. The plurality of reflective surfaces 28a and 29a may be provided around the corresponding holes 28 and 29. The plurality of reflective surfaces 28a and 29a may be inclined toward the corresponding holes 28 and 29. Accordingly, the sunlight transmitted through the first mirror 12a may be reflected by the light sensors 31 and 32 received in the holes 28 and 29 through the plurality of reflective surfaces 28a and 29a, and thus the light sensors 31 and 32 may accurately detect the illuminance or amount of sunlight.

Referring to FIGS. 7 and 8, the mounting bracket 25 may include a recess 25a provided in the second surface 27, and the recess 25a may receive the sensor PCB 36 therein. The recess 25a of the mounting bracket 25 may have a T-like shape corresponding to that of the sensor PCB 36. Accordingly, the sensor PCB 36 may be securely mounted in the recess 25a of the mounting bracket 25.

Referring to FIG. 10, the first light sensor 31 and the second light sensor 32 may be spaced from each other when mounted on the sensor PCB 36. The first light sensor 31 may be attached to one edge portion of the first portion 36a, and the second light sensor 32 may be attached to the second portion 36b. Referring to FIG. 9, the mounting bracket 25 may have the two holes 28 and 29 corresponding to the first light sensor 31 and the second light sensor 32. The plurality of reflective surfaces 28a and 29a may be formed around the corresponding holes 28 and 29, respectively. The plurality of reflective surfaces 28a may be inclined toward the corresponding hole 28, and the plurality of reflective surfaces 29a may be inclined toward the corresponding hole 29.

Figure 11:
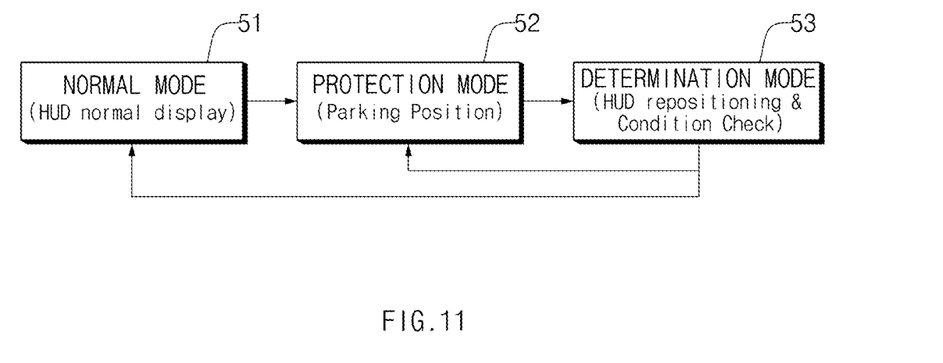
FIG. 11 illustrates operating modes of a head-up display apparatus according to an exemplary embodiment of the present disclosure.

FIG. 11 illustrates operating modes of the head-up display apparatus 10 according to an exemplary embodiment of the present disclosure.

When a surface temperature of the display 11a of the image source 11 is equal to or less than a quality assurance temperature, the controller 17 may control the driving unit 12c to move the second mirror 12b to the operating position P1, and accordingly the head-up display apparatus 10 may operate in a normal mode 51 in which image light of the display 11a of the image source 11 is normally displayed on the windshield 1 of the vehicle.

According to an exemplary embodiment of the present disclosure, the controller 17 may determine or estimate a surface temperature of the display 11a based on the illuminance or amount of sunlight measured by the light sensors 31 and 32.

The controller 17 may predict a time when the surface temperature of the display 11a reaches the quality assurance temperature based on the illuminance or amount of sunlight measured by the light sensors 31 and 32. Two seconds before the time predicted by the controller 17 that the surface temperature of the display 11a reaches the quality assurance temperature, the following message may be displayed on the display 11a: "Head-up display (HUD) will be turned off for system protection due to high temperature of HUD". As such, the controller 17 may control the driving unit 12c to move the second mirror 12b to the protection position P2, and accordingly the head-up display apparatus 10 may operate in a protection mode 52 in which the image light of the display 11a of the image source 11 is not displayed on the windshield 1 of the vehicle.

One hundred twenty (120) seconds after the protection mode 52 is performed, the controller 17 may control the driving unit 12c to move the second mirror 12b to the operating position P1, and the controller 17 may determine (estimate) the surface temperature of the display 11a based on the illuminance or amount of sunlight measured by the light sensors 31 and 32, and accordingly the head-up display apparatus 10 may operate in a determination mode 53 in which it is determined whether the normal mode 51 or the protection mode 52 is selected.

In the determination mode 53, when the determined surface temperature of the display 11a is equal to or less than the quality assurance temperature (in a condition in which the sunlight is not focused), the normal mode 51 may be selected, and when the determined surface temperature of the display 11a exceeds the quality assurance temperature (in a condition in which the sunlight is focused), the protection mode 52 may be selected.

When the vehicle is driving after being stopped in the determination mode 53 or the protection mode 52, the second mirror 12b may be moved to the operating position P1, and the surface temperature of the display 11a may be determined/estimated. After an opening logo is displayed, the normal mode 51 or the protection mode 52 may be performed. When the normal mode 51 is started, the image light of the display 11a may be normally displayed on the windshield 1 after a warning message is displayed. When the protection mode 52 is started, the image light may not be displayed on the windshield 1 after an overheat protection warning message is displayed.

According to another exemplary embodiment of the present disclosure, the temperature sensor or the light sensor 11c mounted on the display 11a may directly measure the surface temperature of the display 11a.

As set forth above, according to exemplary embodiments of the present disclosure, the light sensor provided behind the first mirror may detect the sunlight, and the second mirror may move between the operating position and the protection position based on the sunlight detected by the light sensor so that the image source may be prevented from being damaged by the sunlight, and thus durability of the head-up display apparatus may be significantly improved.

Furthermore, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A head-up display apparatus, comprising:
   an image source including a display;
   a first mirror located above the image source, and having a predetermined transmittance;
   a second mirror facing the first mirror, and selectively moving, by a driving unit, between an operating position and a protection position;

a light sensor located behind the first mirror, and configured for detecting sunlight;
a controller electrically connected to the driving unit and configured for controlling the driving unit based on the sunlight detected by the light sensor;
a housing including the first mirror, the second mirror, the light sensor, and the controller received in the housing; and
a light shield blocking light from being reflected to the outside of the housing, wherein the light shield has a low-reflection plating layer coated on a surface thereof,
wherein the operating position is a position in which light transmission is allowed between the image source and a windshield,
wherein the protection position is a position in which the light transmission is blocked between the image source and the windshield,
wherein the light shield includes a first shield portion provided between the first mirror and the second mirror, and a second shield portion provided between the first mirror and the image source, and
wherein the first shield portion includes a bottom wall extending obliquely from a bottom end portion of the first mirror to a bottom end portion of the second mirror, a pair of side walls provided on first and second sides of the bottom wall, and a rear wall provided on a rear end portion of the bottom wall.

2. The head-up display apparatus of claim 1, wherein the controller is configured to determine a surface temperature of the display of the image source based on the sunlight detected by the light sensor.

3. The head-up display apparatus of claim 1,
wherein the housing includes a main printed circuit board (PCB) received in the housing, and
wherein the controller is electrically connected to the main PCB.

4. The head-up display apparatus of claim 1,
wherein the bottom end portion of the first mirror is located higher than the bottom end portion of the second mirror, and
wherein the bottom wall is inclined by a height difference between the bottom end portion of the first mirror and the bottom end portion of the second mirror.

5. The head-up display apparatus of claim 1, wherein the second shield portion is a duct extending from the first shield portion toward the image source.

6. The head-up display apparatus of claim 1,
wherein the first shield portion has an upper opening which is opened toward the image source, and
wherein the second shield portion has a lower opening which is opened toward the image source.

7. The head-up display apparatus of claim 1,
wherein the first shield portion further includes an extension wall extending from a front edge portion of the bottom wall toward the housing, and
wherein the extension wall is inclined at a predetermined angle corresponding to a movement trajectory of the bottom end portion of the second mirror.

8. The head-up display apparatus of claim 1,
wherein the first shield portion further includes an extension wall extending from a front edge portion of the bottom wall toward the housing, and
wherein the extension wall is curved corresponding to a movement trajectory of the bottom end portion of the second mirror.

9. The head-up display apparatus of claim 1,
wherein the first shield portion has a mounting portion protruding rearward from the rear wall, and
wherein the light sensor is mounted on the mounting portion through a mounting bracket.

10. The head-up display apparatus of claim 9,
wherein the light sensor is mounted on a sensor PCB, and
wherein the sensor PCB is mounted on the mounting bracket.

11. The head-up display apparatus of claim 10,
wherein the mounting bracket has a hole opened toward the first mirror, and
wherein the light sensor is inserted into the hole.

12. The head-up display apparatus of claim 11,
wherein the mounting bracket has a plurality of reflective surfaces provided around the hole, and
wherein the plurality of reflective surfaces are inclined toward the hole.

13. The head-up display apparatus of claim 10,
wherein the sensor PCB is in a shape of "T" including a first portion and a second portion extending perpendicularly from a center portion of the first portion, and
wherein the first portion is longer than the second portion.

14. The head-up display apparatus of claim 1, further including:
a cover detachably joined to a top portion of the housing,
wherein the cover has a transparent window, and
wherein the transparent window of the cover is aligned with an opening of a dashboard.

15. The head-up display apparatus of claim 1,
wherein the controller is configured to determine a surface temperature of the display of the image source based on the sunlight detected by the light sensor,
wherein when the determined surface temperature of the display is equal to or less than a quality assurance temperature, the controller is configured to move the second mirror to the operating position by controlling the driving unit, and
wherein when the determined surface temperature of the display is greater than the quality assurance temperature, the controller is configured to move the second mirror to the protection position by controlling the driving unit.

16. A method of controlling the head-up display apparatus of claim 1, the method comprising:
determining, by the controller, a surface temperature of the display of the image source based on the sunlight detected by the light sensor;
determining, by the controller, whether the determined surface temperature of the display is equal to or less than a quality assurance temperature; and
moving, by the controller, the second mirror to the operating position by controlling the driving unit, when the controller concludes that the determined surface temperature of the display is equal to or less than the quality assurance temperature; and
moving, by the controller, the second mirror to the protection position by controlling the driving unit, when the controller concludes that the determined surface temperature of the display is greater than the quality assurance temperature.

* * * * *